US008214470B2

(12) United States Patent
Quilty (10) Patent No.: US 8,214,470 B2
(45) Date of Patent: Jul. 3, 2012

(54) UPGRADING SOFTWARE IN RADIO BASE STATION NODES (75) Inventor: John Quilty, Athlone (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1266 days.

(21) Appl. No.: 11/939,990

(22) Filed: Nov. 14, 2007

(65) Prior Publication Data
US 2009/0119655 A1 May 7, 2009

Related U.S. Application Data (60) Provisional application No. 60/985,025, filed on Nov. 2, 2007.

(51) Int. Cl.
G06F 15/177 (2006.01)
(52) U.S. Cl. ......... 709/221; 709/222; 709/208; 709/220
(58) Field of Classification Search .................. 709/221, 709/220, 222, 208
See application file for complete search history.

(56) References Cited

U.S. PATENT DOCUMENTS

| 6,141,683 | A | 10/2000 | Kraml et al. | |
|---|---|---|---|---|
| 6,799,037 | B1 | 9/2004 | Mielke et al. | |
| 7,647,039 | B2 * | 1/2010 | Okita et al. | 455/418 |
| 7,853,609 | B2 | 12/2010 | Dehghan et al. | |
| 2002/0075824 | A1 | 6/2002 | Wilckes et al. | |
| 2003/0140339 | A1 | 7/2003 | Shirley et al. | |
| 2004/0203810 | A1 | 10/2004 | Virtanen et al. | |
| 2004/0216099 | A1 | 10/2004 | Okita et al. | |
| 2005/0111484 | A1 | 5/2005 | Obata | |
| 2005/0186952 | A1 | 8/2005 | Kitajima | |
| 2005/0208944 | A1 | 9/2005 | Okita et al. | |
| 2006/0030325 | A1 | 2/2006 | Okita et al. | |
| 2008/0084855 | A1* | 4/2008 | Rahman | 370/342 |
| 2008/0233943 | A1* | 9/2008 | Okita et al. | 455/419 |
| 2008/0320464 | A1* | 12/2008 | Wahlstrom et al. | 717/170 |
| 2010/0291914 | A1 | 11/2010 | Isaksson et al. | |

FOREIGN PATENT DOCUMENTS

EP 1429569 A1 6/2004
(Continued)

OTHER PUBLICATIONS

International Preliminary Report on Patentability mailed May 14, 2010 in corresponding PCT Application No. PCT/SE2008/050045.

(Continued)

Primary Examiner — Lan-Dai T Truong
(74) Attorney, Agent, or Firm — Nixon & Vanderhye, P.C.

(57) ABSTRACT

A cluster-based, delegated software upgrade scheme facilitates software upgrade for radio base station nodes comprising a cluster of a flat radio access telecommunications network. The plural radio base stations are grouped into clusters (30), and a master radio base station ($RBS_M$) designated for each cluster. The master radio base station ($RBS_M$) is used to initiate software upgrade of the radio base stations comprising the cluster. The master radio base station ($RBS_M$) can also perform a monitoring of implementation of the software upgrade at the radio base stations of the cluster, and on the basis of the monitoring, determine whether a cluster-wide software upgrade is successful. In one of its example modes, the master radio base station can further prepare a software upgrade report which confirms/summarizes implementation of the software upgrade at the radio base stations of the cluster.

17 Claims, 7 Drawing Sheets

FOREIGN PATENT DOCUMENTS

| | | |
|---|---|---|
| EP | 1 575 244 A2 | 9/2005 |
| WO | 2008/011149 A2 | 1/2008 |

OTHER PUBLICATIONS

International Search Report and Written Opinion mailed Oct. 30, 2008 in corresponding PCT application PCT/SE2008/050045.

Birkedal et al, "Experiences of Operating a Pre-Commercial WCDMA Network", Eircsson Review No. 2, 2002, pp. 50-61.

3GPP TS 36.420, V10.1.0, $3^{rd}$ Generation Partnership Project; Technical Specification Group Radio Access Network; Evolved Universal Terrestrial Radio Access Network (E-UTRAN); X2 general aspects and principles (Release 10) (Dec. 2010).

3GPP TS 36.421, V10.0.0, $3^{rd}$ Generation Partnership Project; Technical Specification Group Radio Access Network; Evolved Universal Terrestrial Radio Access Network (E-UTRAN); X2 layer 1 (Release 10) (Dec. 2010).

3GPP TS 36.422, V10.0.0, $3^{rd}$ Generation Partnership Project; Technical Specification Group Radio Access Network; Evolved Universal Terrestrial Radio Access Network (E-UTRAN); X2 signalling transport (Release 10) (Dec. 2010).

3GPP TS 36.423, V10.0.0, $3^{rd}$ Generation Partnership Project; Technical Specification Group Radio Access Network; Evolved Universal Terrestrial Radio Access Network (E-UTRAN); X2 application protocol (X2AP) (Release 10) (Dec. 2010).

3GPP TS 36.424, V10.0.0, $3^{rd}$ Generation Partnership Project; Technical Specification Group Radio Access Network; Evolved Universal Terrestrial Radio Access Network (E-UTRAN); X2 data transport (Release 10) (Dec. 2010).

International Search Report for PCT/SE2008/050018, mailed Nov. 5, 2008.

* cited by examiner

UPGRADING SOFTWARE IN RADIO BASE STATION NODES

This application claims the priority and benefit of U.S. Provisional Patent Application 60/985,025, filed Nov. 2, 2007, entitled "UPGRADING SOFTWARE IN RADIO BASE STATION NODES", and which is incorporated herein by reference in its entirety.

BACKGROUND

I. Technical Field

This invention pertains to telecommunications, and particularly to the upgrade (e.g., update or replacement) of software at nodes of a radio access network (RAN).

II. Related Art and Other Considerations

In a typical cellular radio system, mobile terminals (also known as mobile stations and mobile user equipment units (UEs)) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by a unique identity within the local radio area, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network providing wideband code division multiple access for user equipment units (UEs). The Third Generation Partnership Project (3GPP) has undertaken to evolve further the UTRAN and GSM based radio access network technologies.

In a case such as WCDMA networks, as many as a few hundred radio base station nodes may be connected to an RNC. In WCDMA, a radio network controller (RNC) and its subservient radio base stations are collectively known as a Radio Network System (RNS). Similarly, in GSM the radio base stations (typically called "base transceiver stations" or "BTS" in GSM) are connect to a base station controller (BSC) node, with a BSC and its subservient base transceiver stations being collectively referred to as a Base Station Subsystem (BSS).

The radio networks of established operators now have radio base stations (RBS) numbering in the thousand deployed across their networks. When an operator/vendor releases a software revision (e.g., a software release) for the radio base station nodes of its network, all the radio base stations of the operator's network must undergo software update (e.g., software upgrade). The software updates typically require that a radio base station will be out of service for the duration of the update. Generally a radio base station can only be taken out of service during fixed or time-established maintenance windows.

Typically a radio base station is updated through the use of an Operational Support System (OSS). Through its Operational Support System (OSS) the operator typically selects the nodes to be update from a list and initiates the upgrade of those nodes.

Given the size and scale of a typical network, a single Operational Support System (OSS) generally cannot typically handle a full network upgrade within a single maintenance window. This is because, e.g., (i) there are too many radio base stations for the Operational Support System (OSS) to upgrade the whole network in parallel; and (ii) the upgrade duration means that only a limited number of groups can be handled in the maintenance time window.

Rather than upgrading the whole network in parallel, the software upgrades for the radio base station nodes are typically implemented by groups of radio base stations. Group by group implementation of software revisions of the many constituent radio base station nodes of a network, e.g., during maintenance windows, can take an inordinately long time, e.g., weeks in some instances. In cases of WCDMA networks having radio network controller (RNC) nodes, for example, the upgrade can be logically broken down according to the radio network systems (RNS), e.g. radio network systems (RNS) are upgraded at different times. Similarly, in GSM the upgrade can be implemented at different times for different base station systems (BSS).

Figure 1:
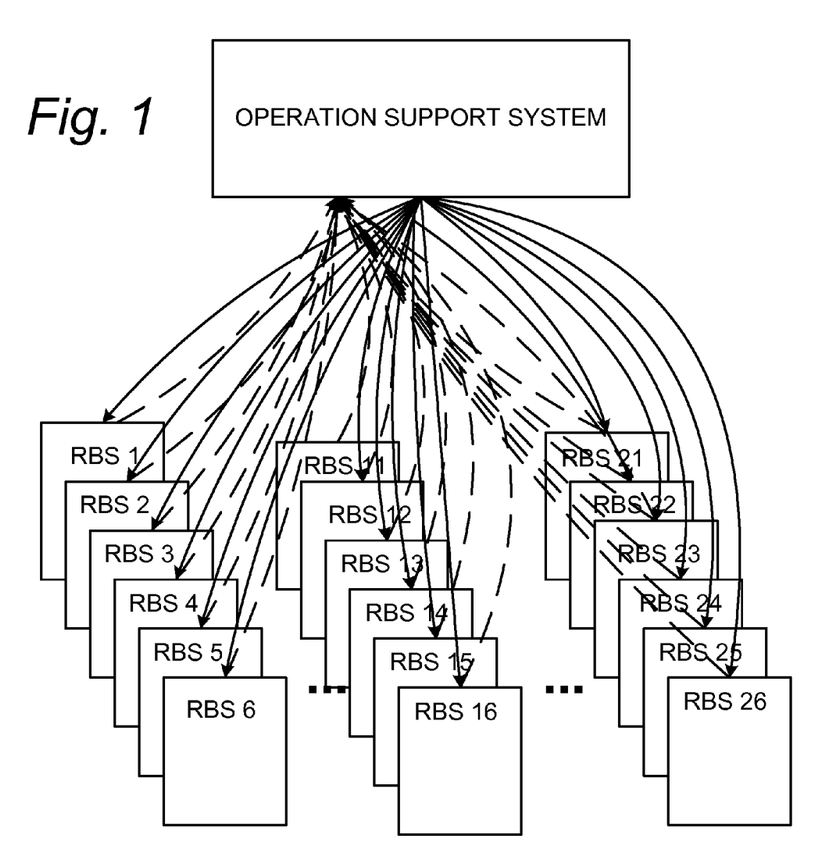
FIG. 1 is a schematic view of a conventional network showing interaction of a operation system entity with each radio base station node of the network in conjunction with a software upgrade for the radio base station nodes.

Even when the software for upgrade radio base stations is upgraded in groups, the software upgrade involves interaction of the Operational Support System (OSS) with each radio base station. FIG. 1 shows, for example, by solid arrows an Operational Support Entity (OSE) downloading a software upgrade for plural radio base stations of a network. FIG. 1 further shows, by broken lines, each radio base station of the network reporting the progress/status of its software upgrade to the Operational Support Entity (OSE).

Long Term Evolution (LTE) is a variant of a 3GPP radio access technology wherein the radio base station nodes are connected directly to a core network rather than to radio network controller (RNC) nodes. In LTE, in general functions of a radio network controller (RNC) node are performed by the radio base stations nodes. As such, the radio access network (RAN) of an LTE system has an essentially "flat" architecture comprising radio base station nodes without reporting to radio network controller (RNC) nodes. The flat architecture of the LTE network makes the software upgrade activity more challenging and labor intensive since, e.g., there are no obvious groupings for software upgrade.

When a software upgrade is unsuccessful at a node, the upgrade is "rolled back" to an original (e.g., previous) software package in order to ensure consistent operation of that region or the radio network controller (RNC). Thus, even if a radio base station grouping were established for sake of software upgrade in an LTE network, it would be unclear (in the case of an upgrade being unsuccessful) which other radio base stations in the group or network should also be rolled back to the original software package.

BRIEF SUMMARY

In one of its aspects the technology concerns a method of operating a flat radio access network. The flat radio access network comprises plural radio base stations, each of the plural radio base stations being connected without an intervening superior radio access node to a core network. An intervening superior radio access node comprises a node of a higher hierarchy which supervises, governs, or controls plural radio base stations.

The method of operating the flat radio access network comprises grouping the plural radio base stations into clusters; designating a master radio base station for a cluster; and, using the master radio base station to initiate (essentially in parallel) software upgrade of the radio base stations comprising the cluster.

In one of its example modes, the method further comprises the master radio base station preparing a software upgrade report which confirms/summarizes implementation of the software upgrade at the radio base stations of the cluster.

In one of its example modes, the method further comprises the master radio base station performing a monitoring of implementation of the software upgrade at the radio base stations of the cluster, and on the basis of the monitoring, determining whether a cluster-wide software upgrade is successful.

In one of its example modes, the method further comprises the master radio base station initiating an upgrade rollback when the master radio base station determines that the cluster-wide software upgrade is not successful.

In one of its example modes, the method further comprises downloading an upgrade policy to the master radio base station, and using the policy to apprise the master radio base station when to initiate the software upgrade.

In one of its example modes, the method further comprises (1) downloading an upgrade policy to the master radio base station; (2) the master radio base station using the upgrade policy to monitor implementation of the software upgrade at the radio base stations of the cluster; and (3) the master radio base station using the policy to determine what upgrade errors encountered during the implementation constitute an upgrade failure. In an example implementation the method further comprises the master radio base station using the policy to determine if a number of upgrade failures encountered during the implementation renders the cluster-wide software upgrade successful.

In another of its aspects the technology concerns a telecommunications network comprising plural radio base stations which comprise a flat radio access network; an operation support entity configured to facilitate a grouping of the plural radio base stations into clusters and a designation of a master radio base station for the cluster; and wherein the master radio base station is configured to initiate (essentially in parallel) software upgrade of the radio base stations comprising the cluster.

In an example embodiment of the network, the master radio base station is configured to prepare a software upgrade report which confirms/summarizes implementation of the software upgrade at the radio base stations of the cluster.

In an example embodiment of the network, the master radio base station is configured to perform a monitoring of implementation of the software upgrade at the radio base stations of the cluster. On the basis of the monitoring, the master radio base station is configured to determine whether a cluster-wide software upgrade is successful.

In an example embodiment of the network, the master radio base station is configured to initiate an upgrade rollback when the master radio base station determines that the cluster-wide software upgrade is not successful.

In an example embodiment of the network, the operation support entity is configured to download an upgrade policy to the master radio base station and is configured to use the policy to apprise the master radio base station when to initiate the software upgrade.

In an example embodiment of the network, the master radio base station is configured (1) to received an upgrade policy downloaded from the master radio base station; (2) to use the upgrade policy to monitor implementation of the software upgrade at the radio base stations of the cluster; and (3) to use the policy to determine what upgrade errors encountered during the implementation constitute an upgrade failure. In an example implementation, the master radio base station is configured to use the policy to determine if a number of upgrade failures encountered during the implementation renders the cluster-wide software upgrade successful.

In another of its aspects the technology concerns an operation support entity for use with a flat radio access network. The operation support entity is configured to facilitate (1) a grouping of the plural radio base stations into clusters; (2) a designation of a master radio base station for the cluster; and (3) authorizing the master radio base station to initiate a (parallel) software upgrade of the radio base stations comprising the cluster. In an example embodiment, the operation support entity is configured to download an upgrade policy to the master radio base station and is configured to use the policy to apprise the master radio base station when to initiate the software upgrade.

In another of its aspects the technology concerns a radio base station node for use in a flat radio access network. The radio base station comprises an interface and an upgrade controller. Through the interface the radio base station receives information comprising (1) a grouping of the plural radio base stations into clusters; (2) a designation of the radio base station as a master radio base station for the cluster. The upgrade controller is configured to initiate a (parallel) software upgrade of the radio base stations comprising the cluster.

In an example embodiment, the radio base station further comprises an upgrade report unit. The upgrade report unit is configured to prepare a software upgrade report which confirm implementation of the software upgrade at the radio base stations of the cluster.

In an example embodiment, the radio base station further comprises an upgrade monitor. The upgrade monitor is configured to perform a monitoring of implementation of the software upgrade at the radio base stations of the cluster. On the basis of the monitoring, the upgrade monitor is configured to determine whether a cluster-wide software upgrade is successful.

In an example embodiment, the upgrade controller of the master radio base station is configured to initiate an upgrade rollback when the upgrade monitor determines that the cluster-wide software upgrade is not successful.

In an example embodiment, the master radio base station is configured to receive an upgrade policy and to use the policy to apprise the master radio base station when to initiate the software upgrade.

In an example embodiment, the master radio base station further comprises a policy memory configured to receive an upgrade policy and an upgrade monitor. The upgrade monitor is configured to use the upgrade policy to monitor implementation of the software upgrade at the radio base stations of the cluster to determine what upgrade errors encountered during the implementation constitute an upgrade failure. In an example implementation, the upgrade monitor is configured to use the policy to determine if a number of upgrade failures encountered during the implementation renders the cluster-wide software upgrade successful.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 2:
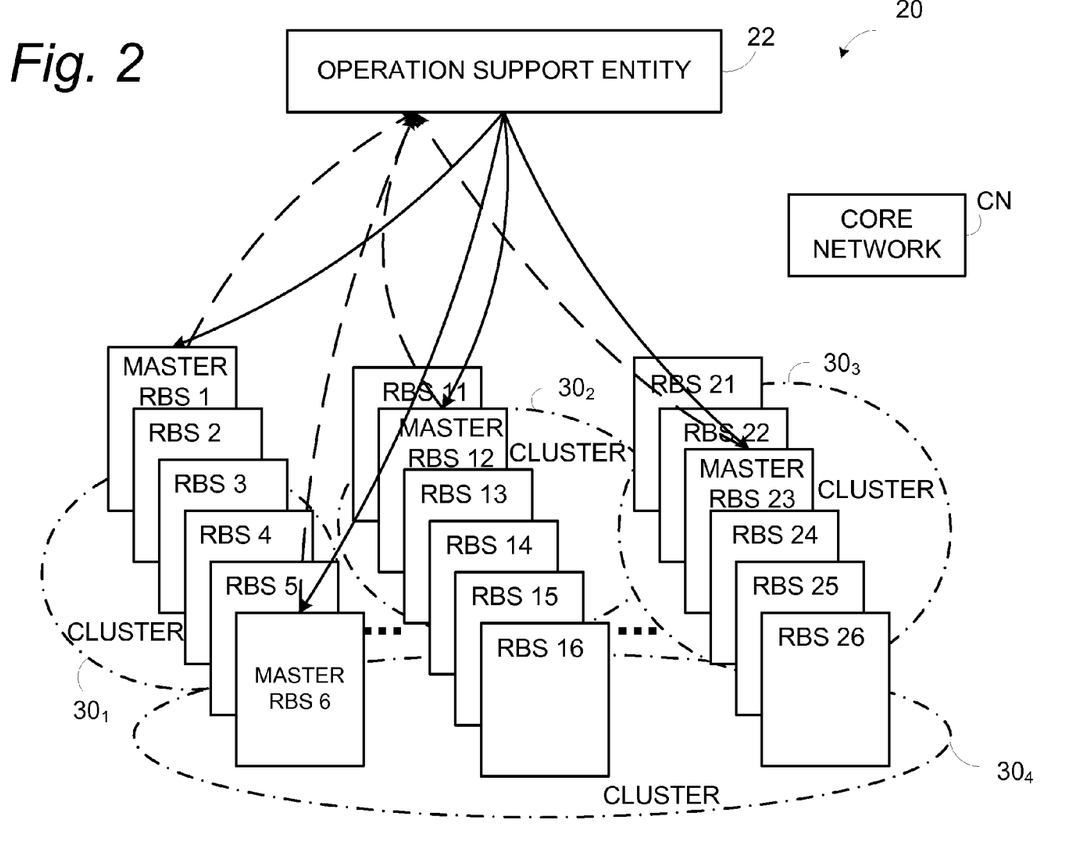
FIG. 2 is a schematic view of a network having a cluster-based delegated software upgrade scheme for upgrading software for the radio base station nodes of the network.

FIG. 2 illustrates, in simplified form and according to a non-limiting example embodiment, a telecommunications network 20 having a cluster-based, delegated software upgrade scheme for upgrading software for the radio base station nodes of the network. In particular, the telecommunications network 20 of FIG. 2 comprises operation support entity (OSE) 22 and plural radio base stations (RBS) which comprise a flat radio access network. As used herein, "flat" radio access network means that each of the plural radio base stations are connected without an intervening superior radio access node to a core network CN. Although such connection of each radio base station to core network CN is not illustrated herein, the connection is understood by the person skilled in the art by reference, for example, to the Long Term Evolution (LTE) variant of a 3GPP radio access network. Moreover, as employed herein, "intervening superior radio access node" means a node of a higher hierarchy which typically supervises, governs, or controls plural radio base stations.

As explained in example fashion hereinafter, operations support entity (OSE) 22 is configured and operated, e.g., to facilitate (1) a grouping of the plural radio base stations into clusters and (2) a designation of a master radio base station for the cluster. For example, FIG. 2 shows RBS 1 through RBS 4 as being grouped into cluster $30_1$; RBS 11 through RBS 14 as being grouped into cluster $30_2$; RBS 21 through RBS 24 as being grouped into cluster $30_3$; and, RBS 5, RBS 6, RBS 15, RBS 16, RBS 25, and RBS 26 as being grouped into cluster $30_4$. FIG. 2 further illustrates that operation support entity (OSE) 22 has designated RBS 1 to be the master radio base station for cluster $30_1$; RBS 12 to be the master radio base station for cluster $30_2$; RBS 23 to be the master radio base station for cluster $30_3$; and, RBS 6 to be the master radio base station for cluster $30_4$. As also further explained herein, each master radio base station is configured to initiate an essentially parallel software upgrade of the radio base stations comprising the cluster for which it is master.

Figure 3:
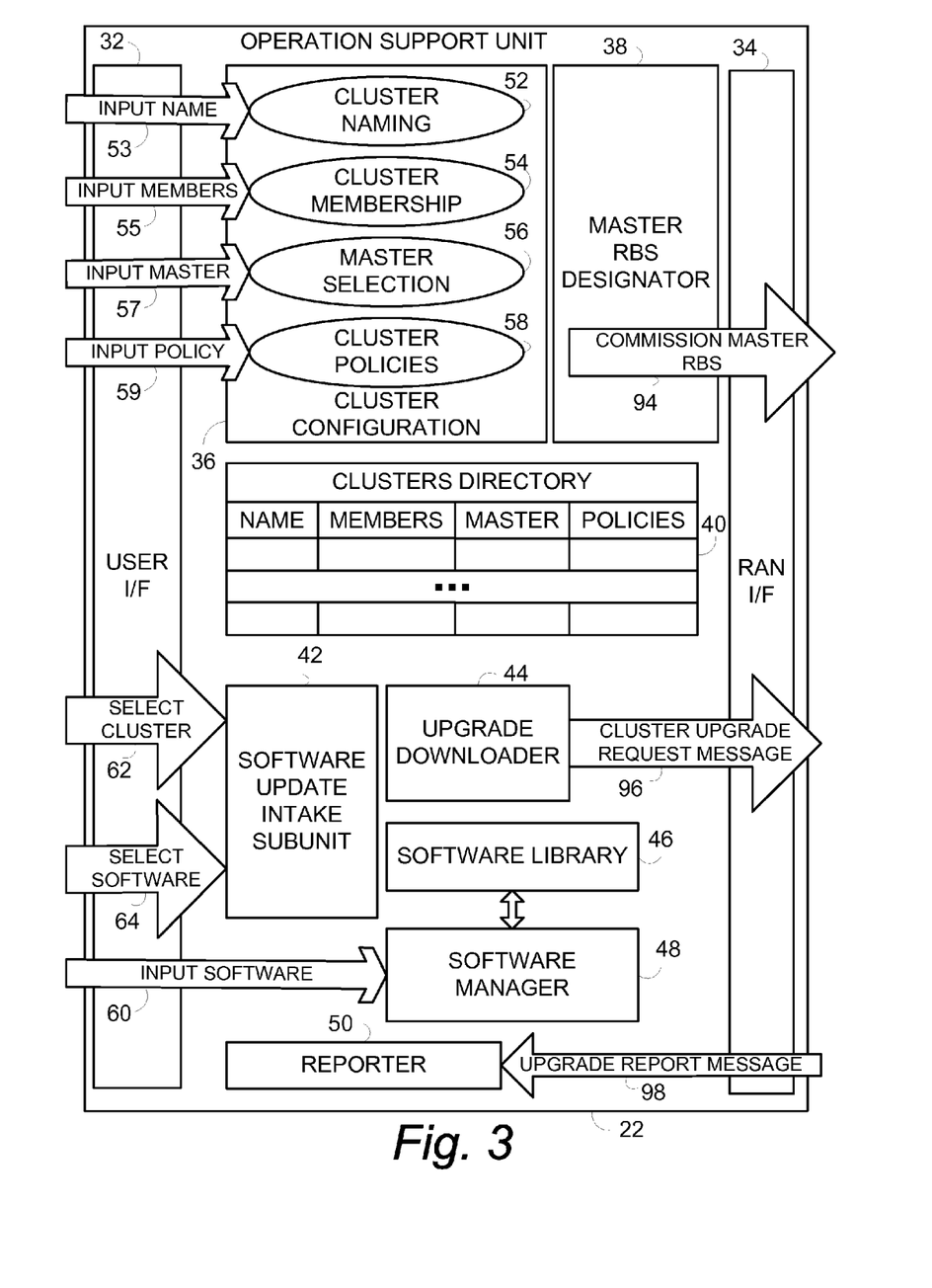
FIG. 3 is a schematic view of an operation support entity (OSE) according to an example embodiment.

FIG. 3 is a schematic view of an operation support entity (OSE) 22 according to an example embodiment. The example operation support entity (OSE) 22 comprises user interface 32; radio access network interface (RAN) 34 (also known as RBS interface 34); cluster configuration subunit 36; master RBS designator 38; clusters directory 40; software update intake subunit 42; upgrade downloader 44; software library 46; software manager 48; and reporter subunit 50.

The cluster configuration subunit 36 comprises cluster naming functionality 52; cluster membership functionality 54; cluster master selection functionality 56; and, cluster policy functionality 58. As illustrated by the respective four arrows 53, 55, 57, and 59, user interface 32 prompts and/or allows for user input to each of the functionalities comprising cluster configuration subunit 36. In this regard, cluster configuration subunit 36 is configured so that via user interface 32 a user can input or provide each of the following: a cluster name which is provided to cluster naming functionality 52 (such input being depicted by arrow 53); one or more radio base station identifiers which are provided to cluster membership functionality 54, the identifiers being used by cluster membership functionality 54 to enumerate the membership of a cluster (e.g., RBS 1, RBS 2, ... in the FIG. 2 example, such input being depicted by arrow 55); an identification of a cluster which is selected to be the upgrade master for the cluster, such identification being provided to cluster master selection functionality 56 (e.g., RBS 6 for cluster $30_4$ in FIG. 2, such input being depicted by arrow 57); and, policy information which is provided for cluster policy functionality 58 (such input being depicted by arrow 59). Thus, the arrangement of the functionalities of cluster configuration subunit 36 can represent an example set of acts by which information is received by cluster configuration subunit 36 through user interface 32 for setting up or configuring a cluster. Such acts need not be performed or executed in any particular order, it being understood that cluster configuration subunit 36 is able to associate the entries with a particular cluster in a meaningful way.

FIG. 3 also illustrates other inputs or interactions facilitated by user interface 32. For example, FIG. 3 illustrates by arrow 60 the input or loading of (upgraded) software into software library 46 via software manager 48. In addition, FIG. 3 illustrates by arrow 62 a selection or identification of a particular cluster for which a software upgrade is to be performed. Further, arrow 64 depicts selection or identification of a particular software module or software upgrade version for which software upgrade is to be performed for a selected/identified cluster. The software loading depicted by arrow 60 can occur either before or after set up (e.g., configuration) of one or more clusters.

The operation support entity (OSE) 22 can be implemented as a stand alone service point, or can co-exist or cooperate with another service point or node. For example, operation support entity (OSE) 22 can reside in the operators' Network Operations Centre (NOC), normally but not exclusively as a Software Management application on the Network Management System (NMS), on the Operation Support System (OSS), or in an Element Management System (EMS) server. Preferably the operation support entity (OSE) 22 resides where it has access to the operators' file transfer protocol (FTP) servers which contain the software packages, and possibly the vendors software delivery system, for download to the FTP servers. "OSS" is terminology used for Network Management System (NMS), or a Network Domain Manager (a telecom management system sitting between the node and the NMS in place of an EMS, and has EMS functionality and some NMS functionality particular to a logical domain such as Radio Access management.

The various subunits and/or functionalities of operation support entity (OSE) 22, such as cluster configuration subunit 36, master RBS designator 38, clusters directory 40, software update intake subunit 42, upgrade downloader 44, software manager 48, and reporter subunit 50 can be realized, in example implementations, by one or more processors or controllers, as those terms are hereinbefore expansively explained. Such processors can be shared, dedicated, distributed, for example.

Figure 4:
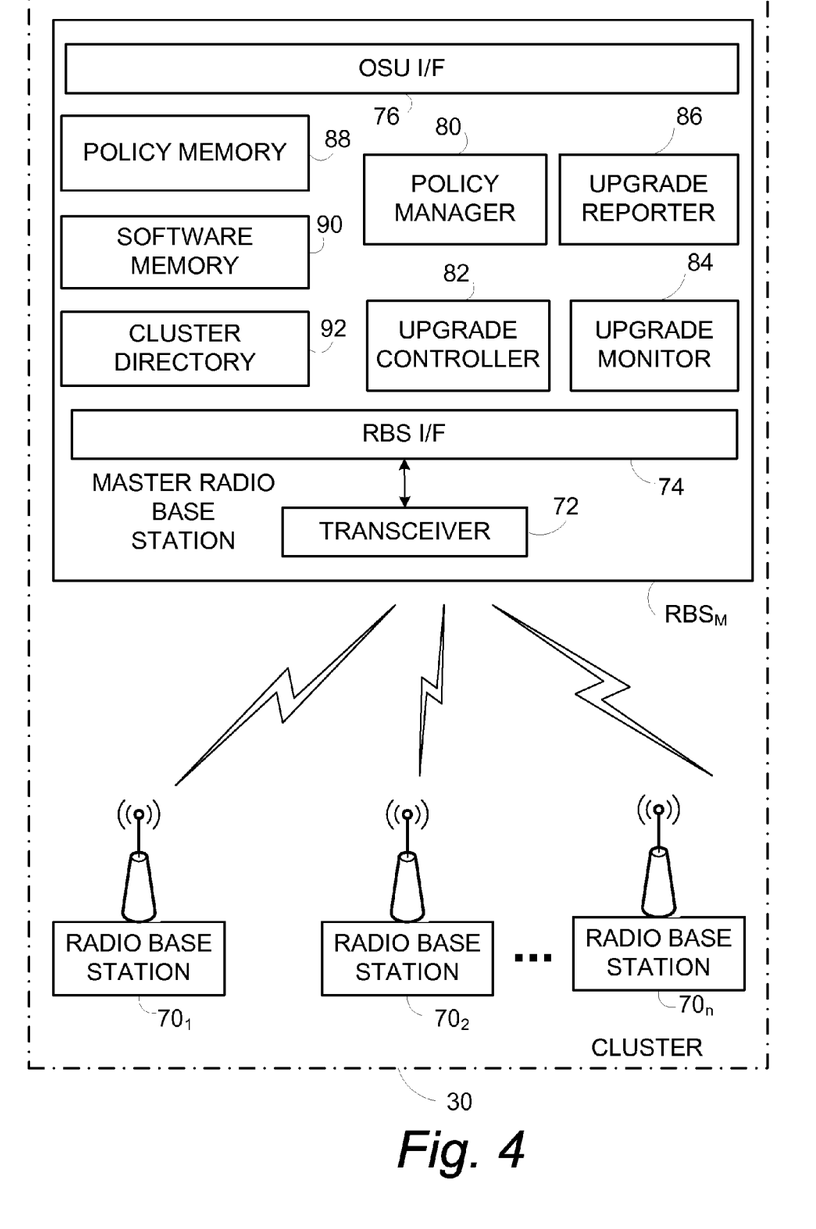
FIG. 4 is a schematic view of an example cluster and a master radio base station according to an example embodiment.

FIG. 4 illustrates an example cluster 30 (framed by a dot-dashed line) and a master radio base station $RBS_M$ according to an example embodiment. In the example situation of FIG. 4, master radio base station $RBS_M$ serves as software upgrade master for each of radio base stations $70_1, 70_2, \ldots 70_n$.

As further shown in FIG. 4, master radio base station $RBS_M$ comprises one or more transceivers 72 through which master radio base station $RBS_M$ communicates over a radio or air interface with the radio base stations 70 of its cluster 30. FIG. 4 also shows RBS interface 74 employed by radio base station $RBS_M$ for communication with the radio base stations 70 of its cluster 30. The master radio base station $RBS_M$ further comprises OSU interface 76 which is connected for communication with operation support entity (OSE) 22. OSU interface 76 can be connected to operation support entity (OSE) 22 via any suitable medium (e.g., wireless or wired connection).

Also included in the example master radio base station $RBS_M$ of FIG. 4 are policy manager 80; upgrade controller 82; upgrade monitor 84; and upgrade reporter 86. The example master radio base station $RBS_M$ also has memory which comprises (for example) policy memory 88; software memory 90; and cluster directory memory 92. These various constituents of the master radio base station $RBS_M$ can be realized, in example implementations, by one or more processors or controllers, as those terms are hereinbefore expansively explained. Such processors can be shared, dedicated, distributed, for example. Moreover, since the master radio base station $RBS_M$ itself functions as a radio base station for a cell or sector which its serves, the master radio base station $RBS_M$ also comprises other elements and units suitable for such operation, as are well known to the person skilled in the art.

Figure 5:
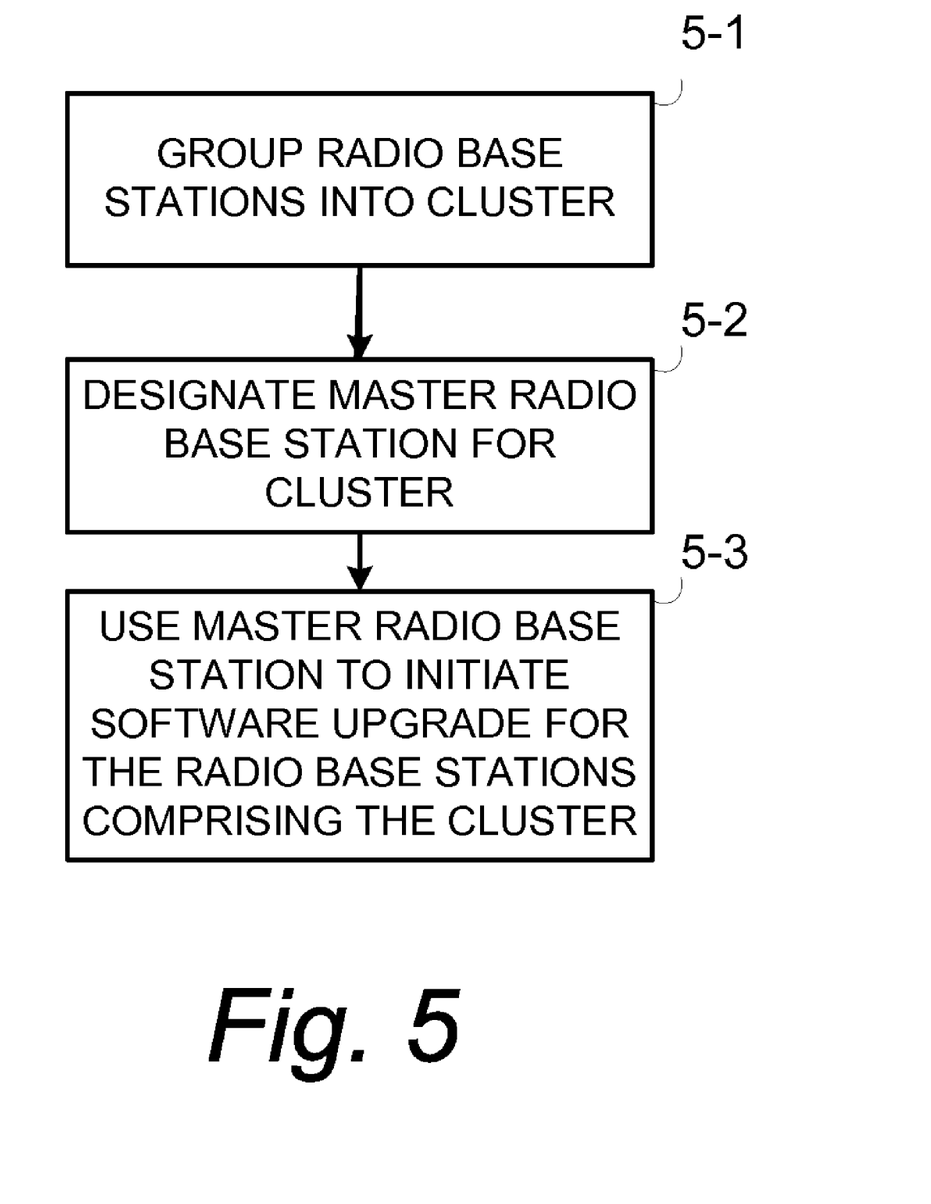
FIG. 5 is a flowchart showing basic acts, events, or steps which are executed or performed by a telecommunications network in conjunction with a method of operating a flat radio access network.

FIG. 5 is a flowchart showing basic acts, events, or steps which are executed or performed by telecommunications network 20 in conjunction with a method of operating a flat radio access network. As shown in FIG. 5, the basic acts include act 5-1 of grouping plural radio base stations into clusters; act 5-2 of designating a master radio base station for a cluster; and, act 5-3 of using the master radio base station to initiate software upgrade of the radio base stations comprising the cluster. The software upgrade is preferably performed in essentially parallel fashion for one or more radio base stations comprising the cluster.

An example implementation of the acts of FIG. 5 is also understood with reference to FIG. 3, which shows use of user interface 32, e.g., to input information or user selection into cluster configuration subunit 36 of operation support entity (OSE) 22. With reference to act 5-1, arrow 53 depicts input of a cluster name and arrow 55 depicts input of the membership of a cluster. For example, with reference to the example flat network 20 of FIG. 2, arrow 53 represents a user employing user interface 32 to name a first cluster such as cluster $30_1$ as "cluster one". Arrow 55 represents a user employing user interface 32 to enumerate or populate the just-named cluster. For example, arrow 53 represents the fact that radio base station numbers RBS 1 through RBS 4 can be entered and associated with the first cluster (i.e., cluster $30_1$). The name of the cluster (e.g., cluster one) and its membership (RBS 1-RBS 4) are stored by cluster configuration subunit 36 in clusters directory 40.

With reference to act 5-2, arrow 57 of FIG. 3 represents a user employing user interface 32 to select or commission a particular radio base station of the cluster to be the master radio base station $RBS_M$ for the cluster. In the example of FIG. 2, for the cluster $30_1$ the radio base station RBS 1 is selected to be the master radio base station. The cluster configuration subunit 36 also stores the identification of the master radio base station $RBS_M$ in clusters directory 40 in association with the cluster.

As a further optional act, arrow 59 represents a user employing user interface 32 to input policy information for the cluster. Such policy information comprises items of information such as what time(s) (e.g., maintenance time windows) are appropriate to initiate a software upgrade; what events or results constitute software upgrade problems, and how many software upgrade problems trigger a rollback of upgrade across the cluster. The cluster configuration subunit 36 also stores the policy information in clusters directory 40 in association with the cluster.

Figure 6:
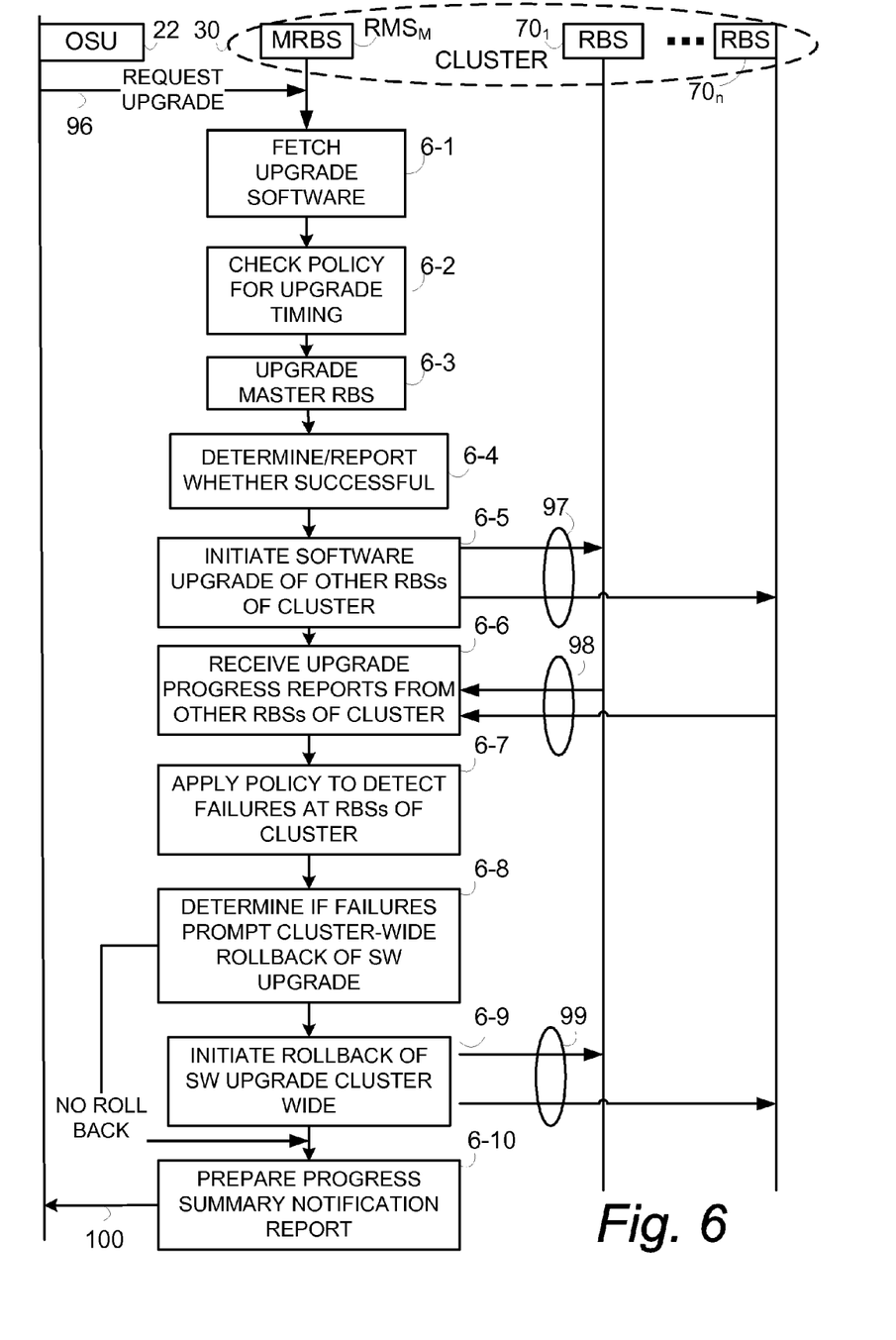
FIG. 6 is a combination schematic view and flowchart showing basic acts, events, or steps which are executed or performed by a telecommunications network and a master radio base station in conjunction with a cluster-based, delegated software upgrade scheme for upgrading software for the radio base station nodes of the network.

Act 5-3 (using the master radio base station to initiate software upgrade of the radio base stations comprising the cluster) is illustrated and/or understood in more detail with reference to FIG. 6. Act 5-3 presumes that the particular upgrade software which is to be used for the upgrade of a cluster has been stored in software library 46. Such loading can be accomplished, e.g., through user interface 32 by user input of software as depicted by arrow 60, which results in software manager 48 storing the upgrade software (e.g., software upgrade or revision) in software library 46.

At an appropriate juncture, such as upon completion of input or entry of information into cluster configuration subunit 36 by the user, master RBS designator 38 is authorized to communicate with the particular radio base station which has been selected as the master radio base station $RBS_M$. In particular, and as represented by arrow 94, master RBS designator 38 sends a message (via radio access network interface (RAN) 34) over the air interface to the master radio base station $RBS_M$. The commission message illustrated by arrow 94 informs the master radio base station $RBS_M$ of information such as (1) the master radio base station $RBS_M$ is a master radio base station for a named cluster; (2) the RBS composition of the named cluster (an enumeration of other radio base stations which comprise the named cluster); and (3) the upgrade policy for the cluster for which master radio base station $RBS_M$ is the master. The arrow 94 thus represents and is sometimes referred to as the master commission message 94.

Upon receipt of master commission message 94, the master radio base station $RBS_M$ stores the information regarding the RBS composition of the cluster for which it is master in cluster directory memory 92. Further, under control of policy manager 80, master radio base station $RBS_M$ also stores any policy(ies) received in master commission message 94 in policy memory 88.

At the outset act 5-3 typically involves a user selecting, via user interface 32 and as illustrated by respective arrow 62 and arrow 64, both a particular cluster for which software upgrade is to be performed and an identification of a particular piece of software for use as the software upgrade version. It should be appreciated in this regard that a software upgrade operation as described herein may affect either all or part of the software associated with the radio base stations of the cluster. In situations in which only a part of the software of a radio base station is affected, the input reflected by arrow 64 is sufficient to identify the particular modules, routines, subroutines, or functions which are involved in the upgrade.

The inputs of cluster selection (arrow 62) and software selection (64) are utilized by software update intake subunit 42 to prepare software upgrade downloader 44 so that update downloader 44 can prepare a cluster upgrade request for transmission to the selected cluster. In preparing update downloader 44, software update intake subunit 42 consults the clusters directory 40 to obtain an identification of the radio base station which serves as the master radio base station for the selected cluster. Arrow 96 of FIG. 3 represents a cluster upgrade request which is prepared by update downloader 44 and transmitted from operation support entity (OSE) 22 via radio access network interface (RAN) 34 and over the air interface to the particular radio base station (e.g., master radio base station $RBS_M$) which serves as the master for the selected cluster.

In one example and optional variation, the cluster upgrade request message 96 also includes the content (e.g., executable code) of the software revision which is to be used for the software upgrade of the cluster. Thus, in this optional variation, update downloader 44 can fetch via software manager 48 and from software library 46 the particular upgrade software which was selected (such software selection being depicted by arrow 64), and can include the code for such selected software in cluster upgrade request message 96.

FIG. 6 shows basic acts, events, or steps which can comprise act 5-3 and which are executed or performed by telecommunications network 20 including master radio base station $RBS_M$ in conjunction with the cluster-based, delegated software upgrade scheme for upgrading software for the radio base station nodes of the network. FIG. 6 shows the cluster upgrade request message 96 sent from operation support entity (OSE) 22 to master radio base station $RBS_M$ over the air or radio interface. Upon receipt, upgrade controller 82 of master radio base station $RBS_M$ analyzes the cluster upgrade request message 96 and determines what particular piece of software (e.g., software revision) is to be utilized for the software upgrade for the cluster. In some example modes, the software revision (e.g., the actual executable code for the software upgrade) is included in cluster upgrade request message 96 and is stored in software memory 90. But in other modes, and as shown by optional act 6-1, master radio base station $RBS_M$ can fetch the upgrade software from another location and then store the fetched software in software memory 90. The software which need be fetched can be procured from (for example) operation support entity (OSE) 22, or another service point or node. The address or location of such other node or service point may be configured at master radio base station $RBS_M$, included in cluster upgrade request message 96, or obtained by other means.

As act 6-2 the upgrade controller 82 of master radio base station $RBS_M$ consults policy manager 80 to ascertain the appropriate timing for implementing the software upgrade for the cluster. The upgrade policy as stored in policy memory 88 and accessible via policy manager 80 can specify, for example, certain maintenance windows or other time periods in which software upgrade is permissible or desired for the radio base stations of the cluster. Thus, in one of its example modes, the master radio base station $RBS_M$ can download or otherwise obtain an upgrade policy, and can use the policy to apprise the master radio base station of such matters and information as, for example, when to initiate the software upgrade.

As act 6-3 the upgrade controller 82 initiates and performs an upgrade of the software of the master radio base station $RBS_M$. Thereafter, as act 6-4, upgrade controller 82 determines whether the upgrade of software for its own master radio base station $RBS_M$ is successful and (as an optional feature) employs upgrade reporter 86 to prepare a report (e.g., to inform operation support entity (OSE) 22 of the status/result of the upgrade of master radio base station $RBS_M$). The remainder of the acts shown and described with reference to FIG. 6 presume that the software upgrade of the master radio base station $RBS_M$ is successful. Otherwise, the operation support entity (OSE) 22 is advised of failure and the upgrade for the cluster is terminated.

Figure 7:
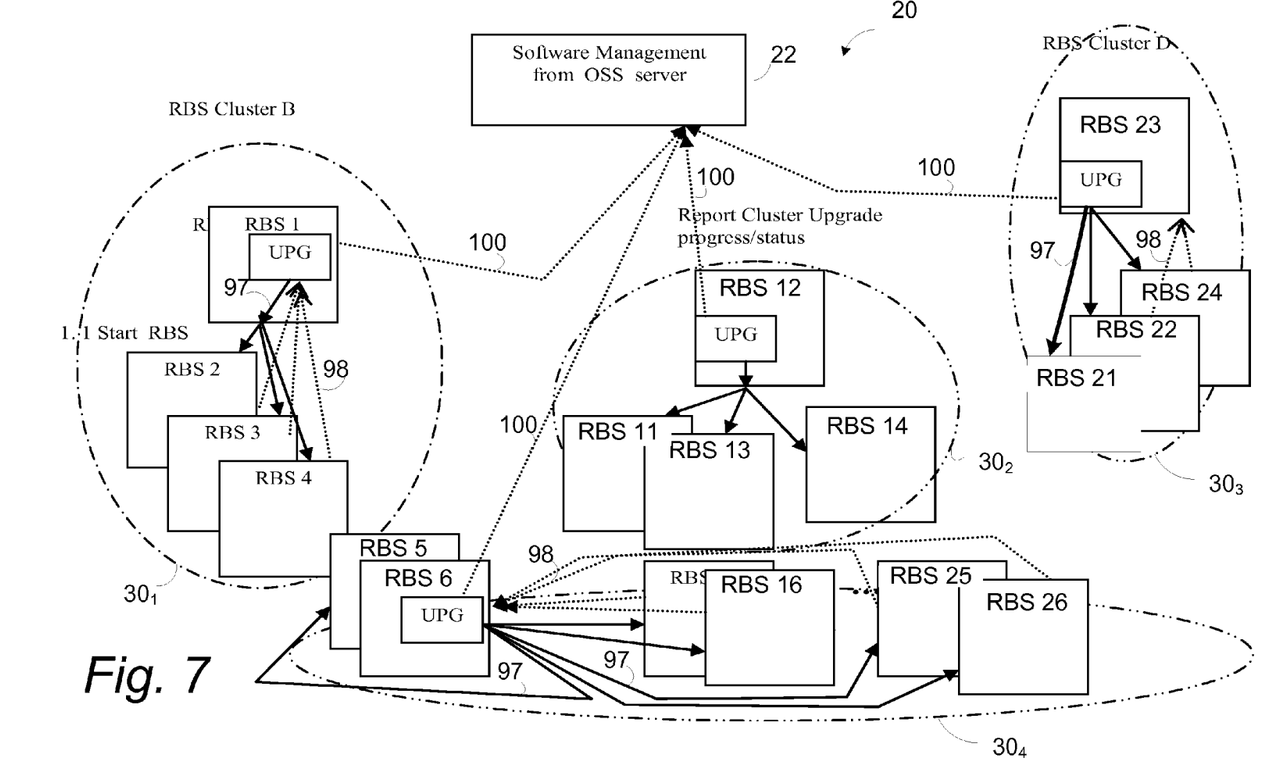
FIG. 7 is a schematic view of an example telecommunications network 20 and particularly showing upgrading of radio base stations of a cluster by a master radio base station after the master radio base station itself has been upgraded.

As act 6-5, upgrade controller 82 initiates software upgrade of the other radio base stations of the cluster. Software upgrade messages 97 are sent from master radio base station $RBS_M$ to each of the radio base stations comprising the cluster, preferable in parallel fashion. During and/or upon completion of the upgrade, as act 6-6 upgrade monitor 84 of master radio base station $RBS_M$ monitors and receives progress/status reports from the radio base stations of the cluster which are undergoing upgrade. Thus, upgrade monitor 84 receives progress/status report messages 98 from the radio base stations comprising the cluster. FIG. 7 shows transmission of the software upgrade messages 97 and the progress/status report messages 98 for each cluster, and thus illustrates the master radio base station $RBS_M$ initiating upgrade of each radio base station of its cluster.

Certain events or circumstances may arise or occur during the software upgrade procedure performed at a radio base station of the cluster. Upon detecting or being informed of such events or circumstances, upgrade monitor 84 can consult policy memory 88 to determine whether those events or circumstances constitute a failure of the software upgrade for a particular radio base station of the cluster. Thus, act 6-7 comprises applying the policy (from policy memory 88 as accessed and/or interpreted by policy manager 80 to determine/detect a failure at a radio base station of the cluster. The policy stored at policy memory 88 may also include criteria for determining whether a failure at one or more radio base stations of the cluster (e.g., either a failure at one radio base station or failures of various type(s) at multiple radio base stations of the cluster) constitute reason for a cluster-wide rollback of the software upgrade. A "rollback" can encompass, for example, a return for each radio base station of the cluster to a software status or state which existed prior to the attempted software upgrade. In the event that a rollback is determined at act 6-8 to be justified, such rollback is initiated as act 6-9 and involves upgrade controller 82 communicating with each radio base station of the cluster through rollback messages 99 to essentially "undo" or reverse the actions taken in conjunction with the attempted but failed software upgrade.

Thus, in one of its example modes, the master radio base station can perform a monitoring of implementation of the software upgrade at the radio base stations of the cluster, and on the basis of the monitoring, determining whether a cluster-wide software upgrade is successful.

When a software upgrade is determined by upgrade monitor 84 to be complete, or if a report of progress/status is desirable, upgrade reporter 86 of master radio base station $RBS_M$ prepares and sends to operation support entity (OSE) 22 a progress summary notification report. Transmission of such report is depicted by arrow 100 (the upgrade report message) in both FIG. 4 and FIG. 6. The software upgrade report 100 confirms/summarizes implementation of the software upgrade at the radio base stations of the cluster.

If failures such as those detected at act 6-7 do not require a cluster wide rollback (as determined at act 6-8), a report on the unsuccessful rolled back upgrades is included in the report sent to operation support entity (OSE) 22, with detailed error logs for those upgrades stored on the Master RBS. If the upgrade is unsuccessful and the rollback is not possible, then the Master RBS can issue priority alarms. This can occur in either of two scenarios. In a first scenario, if the upgrade of a slave RBS fails and communication with that RBS is not re-established, a critical alarm needs to be immediately issued to operation support entity (OSE) 22 (since a physical site visit maybe required). In a second scenario, the upgrade is faulty and rollback fails, but communication to the slave RBS is still possible. In this second scenario, the Master RBS should test that the Alarm mechanism for the slave RBS is still active. If the Alarm mechanism for the slave RBS is not still active, an attempt should be made to powerdown the slave RBS and issue a Major Alarm to operation support entity (OSE) 22, escalating to critical if the powerdown fails (since a physical site visit maybe required). Otherwise, the Master RBS should issue a Warning to operation support entity (OSE) 22 that the slave RBS upgrade was faulty as well as including the details in the Master RBS summary progress report.

Thus, the technology herein encompassed and described involves a management hierarchy overlaid over a flat traffic network. The radio base stations of the flat traffic network are organized or grouped into management clusters, and wherein for each cluster one radio base station (or perhaps two radio base stations for the purpose of redundancy) is/are designated as a master radio base station within and for the cluster.

The master radio base station supports enhanced operation and management (O&M) functionality, and acts as an aggregator and controller of O&M functionality within the cluster. In the case of software management a user (e.g., operator) can use an operation support entity (OSE) 22 (e.g., an OSS system) to request an essentially parallel upgrade for radio base stations comprising a cluster. The master radio base station can both initiate and monitor the parallel upgrade of all radio base stations within its cluster. In at least some example embodiments and modes, the master radio base station can issue a upgrade report back to the OSS indicating which radio base stations were upgraded successfully and what problems (if any) occurred.

As explained in part above, in at least some example embodiments and modes the master RBS can have a software upgrade policy configured at or downloaded to the master radio base station node that indicates and/or classifies what events or circumstances constitute software upgrade problems, and how many such problems trigger a rollback of upgrade across the cluster.

In one of its aspects, the technology thus involves an operation support entity (OSE) 22 (e.g., an OSS) provides a configuration function. The configuration function of the operation support entity (OSE) 22 (e.g., cluster configuration subunit 36) allows the operator to create a cluster; choose what radio base stations are to be added to or included in the cluster; and choose to configure the master radio base station for the cluster. The OSS application can also support the configuration of the software upgrade policies for the master radio base station. These policies can indicate, for example, the information such as the maintenance window times, the rules that indicate what upgrade errors indicate a failure, and how many failures dictate a failure for a RBS cluster-wide upgrade and thus require a rollback on all upgrade nodes in the cluster.

The OSS software management function (e.g., software update intake subunit 42) allows for the selection of a radio base station cluster to be a candidate for upgrade. The operator selects the cluster for upgrade, as indicated by arrow 62 in FIG. 3. The operation support entity (OSE) 22 sends an upgrade request message 96 to the master radio base station. The upgrade control software such as upgrade controller 82 in the master RBS (also illustrated as UPG in FIG. 7) identifies that a radio base station cluster upgrade is needed. The master radio base station upgrades itself (act 6-3) and, if self-upgrade is successful, the master radio base station initiates upgrade of all other radio base stations in the cluster (act 6-5). The software upgrade monitor 84 receives progress information from the individual radio base stations of the cluster and compiles it into a summarized progress notification message 100 towards the operation support entity (OSE) 22.

By prudently using the technology (e.g., managing the cluster sizes) the entire network can be upgraded in one Maintenance window.

The upgrade request (e.g., cluster upgrade request message 96) from the operation support entity (OSE) 22 to the master radio base station can be sent using the an existing or new software management interface of the radio base station (e.g., as an SNMP set action send over IP, or a Corba request over IIOP, or CLI executed within a secure shell session, of a Netconf request). The notification such as upgrade report message 100 sent back by the master radio base station to the operation support entity (OSE) 22 can be sent over a standard O&M notification interface of the radio base station (this can be as a SNMP trap event over IP, or a notification sent over the Corba Notification service, or as standout out to a secure shell as responses to a CLI).

The requests and notifications to and from the master radio base station to the other radio base stations of the cluster (e.g., software upgrade messages 97 and progress/status report messages 98, respectively) can reuse the radio base station O&M software management and notification interfaces (described above) or be sent as O&M messages within an existing inter-radio base station protocol such as the LTE X2 protocol, or via a dedicated O&M inter-radio base station protocol that can be set up between the master radio base station and other radio base stations as they are added to the cluster. The setup of a dedicated O&M interface can automatically be facilitated by carrying the protocol over carrier protocols such as SCTP.

The technology described herein has many advantages. One such advantage is ability of the operation support system (OSS) to upgrade larger numbers of radio base stations in parallel. Another advantage is bandwidth savings in the transport network connection to the OSS, since data is sent first to the master radio base station and the master radio base station then distributes the data to the members of the cluster. A further advantage is that the cluster structure allows an operator to exercise more control on which parts of the network will get upgraded in a single transactional step.

The technology is particularly but not exclusively applicable for LTE, as the problem hereby solved brings hierarchal O&M control in flat network architecture. The technology can also be applied to WCDMA, CMDA2000, WiMax, and Wifi radio networks.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a flat radio access network comprising plural radio base stations, the method comprising:
    grouping the plural radio base stations into clusters, each of the plural radio base stations being connected without an intervening superior radio access node to a core network;
    designating a master radio base station for a cluster, wherein the master radio base station is one of the plural radio base stations in the cluster;
    using the master radio base station to initiate a parallel software upgrade of the radio base stations in the cluster;
    using the master radio base station to perform a monitoring of implementation of the parallel software upgrade at the radio base stations of the cluster, and on the basis of the monitoring, determining whether the parallel software upgrade is successful; and
    using the master radio base station to initiate an upgrade rollback when the master radio base station determines that the parallel software upgrade is not successful;
    using the master radio base station to issue different priority alarms to an operation support entity if the parallel software upgrade is not successful and the upgrade rollback is not possible related to a network problem or the software upgrade was faulty.

2. The method of claim 1, further comprising the master radio base station preparing a software upgrade report which confirms and summarizes implementation of the parallel software upgrade at the radio base stations of the cluster.

3. The method of claim 1, further comprising downloading an upgrade policy to the master radio base station, and using the upgrade policy to apprise the master radio base station when to initiate the parallel software upgrade.

4. The method of claim 1, further comprising:
    downloading an upgrade policy to the master radio base station;
    the master radio base station using the upgrade policy to monitor implementation of the parallel software upgrade at the radio base stations of the cluster;
    the master radio base station using the upgrade policy to determine what upgrade errors encountered during the implementation constitute an upgrade failure.

5. The method of claim 4, further comprising the master radio base station using the upgrade policy to determine if a number of upgrade failures encountered during the implementation renders the parallel software upgrade successful.

6. A telecommunications network comprising:
    plural radio base stations in a flat radio access network, wherein each of the plural radio base stations being connected without an intervening superior radio access node to a core network;
    wherein each of the plural of radio base stations comprises at least one hardware processor;
    an operation support entity configured to facilitate a grouping of the plural radio base stations into clusters and a designation of a master radio base station for the cluster, wherein the master radio base station is one of the plurality radio base stations in the cluster;
    wherein the master radio base station is configured to initiate a parallel software upgrade of the radio base stations in the cluster;

wherein the master radio base station is configured to perform a monitoring of implementation of the parallel software upgrade at the radio base stations of the cluster;

wherein, on the basis of the monitoring, the master radio base station is configured to determine whether the parallel software upgrade is successful; and wherein the master radio base station is configured to initiate an upgrade rollback when the master radio base station determines that the parallel software upgrade is not successful;

wherein the master radio base station is configured to issue different priority alarms to an operation support entity if the parallel software upgrade is not successful and the upgrade rollback is not possible related to network problem or the software upgrade was faulty.

7. The telecommunication network of claim 6, wherein the master radio base station is configured to prepare a software upgrade report which confirms and summarizes implementation of the parallel software upgrade at the radio base stations of the cluster.

8. The telecommunication network of claim 6, wherein the operation support entity is configured to download an upgrade policy to the master radio base station and is configured to use the upgrade policy to apprise the master radio base station when to initiate the parallel software upgrade.

9. The telecommunication network of claim 6, wherein the master radio base station is configured (1) to received an upgrade policy downloaded from the master radio base station; (2) to use the upgrade policy to monitor implementation of the parallel software upgrade at the radio base stations of the cluster; and (3) to use the upgrade policy to determine what upgrade errors encountered during the implementation constitute an upgrade failure.

10. The telecommunication network of claim 9, wherein the master radio base station is configured to use the upgrade policy to determine if a number of upgrade failures encountered during the implementation renders the parallel software upgrade successful.

11. An operation support entity for use with a flat radio access network comprising:
hardware processor;
the operation support entity being configured to facilitate (1) a grouping of a plural radio base stations into clusters, each of the plural radio base stations being connected without an intervening superior radio access node to a core network; (2) a designation of a master radio base station for the cluster, wherein the master radio base station is one of the plural radio base stations in the cluster, and (3) authorizing the master radio base station to:
initiate a parallel software upgrade of the radio base stations in the cluster;
perform a monitoring of implementation of the parallel software upgrade of the radio base stations of the cluster;
on the basis of the monitoring, determine whether the parallel software upgrade is successful, and
initiate an upgrade rollback when it is determined that the parallel software upgrade is not successful;
issue different priority alarms to the operation support entity if the parallel software upgrade is not successful and the upgrade rollback is not possible related to network problem or the software upgrade was faulty.

12. The operation support entity of claim 11, wherein the operation support entity is configured to download an upgrade policy to the master radio base station and is configured to use the upgrade policy to apprise the master radio base station when to initiate the parallel software upgrade.

13. A radio base station for use in a flat radio access network, the radio base station comprising:
hardware processor;
an interface through which the radio base station receives information comprising (1) a grouping of a plural radio base stations into clusters; (2) a designation of the radio base station as a master radio base station for the cluster, wherein the master radio base station is one of the plural radio base stations in the cluster;
an upgrade controller configured to initiate a parallel software upgrade of the radio base stations in the cluster;
an upgrade monitor configured to perform a monitoring of implementation of the parallel software upgrade at the radio base stations of the cluster, and on the basis of the monitoring, determine whether the parallel software upgrade is successful, and
wherein the upgrade controller is further configured to initiate an upgrade rollback when the upgrade monitor determines that the parallel software upgrade is not successful;
wherein the upgrade controller is further configured to issue different priority alarms to an operation support entity if the parallel software upgrade is not successful and the upgrade rollback is not possible related to network problem or the software upgrade was faulty;
wherein the plural radio base stations being connected without an intervening superior radio access node to a core networks.

14. The radio base station node of claim 13, wherein the radio base station further comprises an upgrade report unit configured to prepare a software upgrade report which confirms implementation of the parallel software upgrade at the radio base stations of the cluster.

15. The radio base station of claim 13, wherein the upgrade controller configured to obtain an upgrade policy and is configured to use the upgrade policy to apprise the master radio base station when to initiate the parallel software upgrade.

16. The radio base station of claim 13, further comprising a policy memory configured to receive an upgrade policy and upgrade monitor, and wherein the upgrade monitor is configured to use the upgrade policy to monitor implementation of the parallel software upgrade at the radio base stations of the cluster to determine what upgrade errors encountered during the implementation constitute an upgrade failure.

17. The radio base station of claim 16, wherein the upgrade monitor is configured to use the upgrade policy to determine if a number of upgrade failures encountered during the implementation renders the parallel software upgrade successful.

* * * * *

UNITED STATES PATENT AND TRADEMARK OFFICE
CERTIFICATE OF CORRECTION

PATENT NO. : 8,214,470 B2
APPLICATION NO. : 11/939990
DATED : July 3, 2012
INVENTOR(S) : Quilty Page 1 of 1

It is certified that error appears in the above-identified patent and that said Letters Patent is hereby corrected as shown below:

On Page 2, in Field (56), under "OTHER PUBLICATIONS", in Column 1,
Line 4, delete "Eircsson" and insert -- Ericsson --, therefor.

In Column 13, Line 43, delete "CMDA2000," and insert -- CDMA2000, --, therefor.

In Column 15, Line 16, in Claim 7, delete "telecommunication" and
insert -- telecommunications --, therefor.

In Column 15, Line 21, in Claim 8, delete "telecommunication" and
insert -- telecommunications --, therefor.

In Column 15, Line 26, in Claim 9, delete "telecommunication" and
insert -- telecommunications --, therefor.

In Column 15, Line 34, in Claim 10, delete "telecommunication" and
insert -- telecommunications --, therefor.

Signed and Sealed this
Twelfth Day of February, 2013

Teresa Stanek Rea
*Acting Director of the United States Patent and Trademark Office*